US011818093B2

(12) United States Patent
Bae et al.

(10) Patent No.: US 11,818,093 B2
(45) Date of Patent: Nov. 14, 2023

(54) APPARATUS AND METHOD FOR OPERATING MULTIPLE FPGAS IN WIRELESS COMMUNICATION SYSTEM

(71) Applicant: Samsung Electronics Co., Ltd., Suwon-si (KR)

(72) Inventors: Jinwoo Bae, Suwon-si (KR); Hyunjoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/638,778

(22) PCT Filed: Jun. 2, 2020

(86) PCT No.: PCT/KR2020/007109
§ 371 (c)(1),
(2) Date: Feb. 25, 2022

(87) PCT Pub. No.: WO2021/040196
PCT Pub. Date: Mar. 4, 2021

(65) Prior Publication Data
US 2022/0278956 A1    Sep. 1, 2022

(30) Foreign Application Priority Data
Aug. 27, 2019  (KR) .................. 10-2019-0105414

(51) Int. Cl.
*H04L 61/5007* (2022.01)
*G06F 13/362* (2006.01)
(Continued)

(52) U.S. Cl.
CPC ........ *H04L 61/5007* (2022.05); *G06F 13/362* (2013.01); *H04L 2101/695* (2022.05); *H04W 88/08* (2013.01)

(58) Field of Classification Search
CPC .................. H04L 61/5007; G06F 13/362
See application file for complete search history.

(56) References Cited

U.S. PATENT DOCUMENTS 6,662,285 B1    12/2003  Douglass et al.
6,937,061 B1 *  8/2005  Crosland .............. G06F 12/06
                                                    711/E12.086
(Continued)

FOREIGN PATENT DOCUMENTS

JP      2010-528509 A       8/2010
KR   10-2015-0135835 A     12/2015
WO      2012171582 A1     12/2012

OTHER PUBLICATIONS

International Search Report and Written Opinion of the International Searching Authority dated Sep. 15, 2020, in connection with International Application No. PCT/KR2020/007109, 9 pages.
(Continued)

*Primary Examiner* — Christopher B Robinson

(57) ABSTRACT

The disclosure relates to a 5th Generation (5G) or pre-5G communication system for supporting a higher data rate than a 4th Generation (4G) communication system such as Long Term Evolution (LTE). According to various embodiments of the disclosure, an apparatus of a base station in a wireless communication system is provided. The apparatus includes: a master Field Programmable Gate Array (FPGA); a plurality of slave FPGAs controlled by the master FPGA; and an address masker coupled to the master FPGA and the plurality of slave FPGAs, wherein the address masker is configured to: receive different address bits assigned respectively to the plurality of slave FPGAs by the master FPGA; for the different address bits, mask bit values at a specific position with the same value; and transmit masked address bits corresponding respectively to the plurality of slave FPGAs.

15 Claims, 18 Drawing Sheets

(51) Int. Cl.
   *H04L 101/695*  (2022.01)
   *H04W 88/08*  (2009.01)

(56) References Cited

U.S. PATENT DOCUMENTS

| | | | |
|---|---|---|---|
| 7,076,595 | B1 | 7/2006 | Dao et al. |
| 2002/0008540 | A1* | 1/2002 | Britton .................... H03K 5/13 |
| | | | 326/40 |
| 2002/0138156 | A1 | 9/2002 | Wong et al. |
| 2008/0222329 | A1* | 9/2008 | Vorbach .............. G06F 15/7867 |
| | | | 710/100 |
| 2009/0292978 | A1 | 11/2009 | Miyama et al. |
| 2010/0138576 | A1 | 6/2010 | Goerlich et al. |
| 2011/0022907 | A1 | 1/2011 | Jiang et al. |
| 2011/0227605 | A1 | 9/2011 | Watanabe et al. |
| 2013/0049801 | A1 | 2/2013 | Sun |
| 2014/0068125 | A1 | 3/2014 | Pullagoundapatti et al. |
| 2015/0227662 | A1 | 8/2015 | Lepercq |
| 2015/0339248 | A1 | 11/2015 | Choi |
| 2015/0365740 | A1 | 12/2015 | Shinohara |
| 2016/0307612 | A1 | 10/2016 | Tan et al. |
| 2016/0313725 | A1 | 10/2016 | Yan et al. |
| 2016/0315620 | A1 | 10/2016 | Fan et al. |

OTHER PUBLICATIONS

Supplementary European Search Report dated Sep. 23, 2022 in connection with European Patent Application No. 20 85 8686, 5 pages.

* cited by examiner

APPARATUS AND METHOD FOR OPERATING MULTIPLE FPGAS IN WIRELESS COMMUNICATION SYSTEM

CROSS-REFERENCE TO RELATED APPLICATIONS

This application is a 371 National Stage of International Application No. PCT/KR2020/007109, filed Jun. 2, 2020, which claims priority to Korean Patent Application No. 10-2019-0105414, filed Aug. 27, 2019, the disclosures of which are herein incorporated by reference in their entirety.

BACKGROUND

1. Field

The disclosure relates in general to a wireless communication system, and in particular to an apparatus and method for operating a multi-Field Programmable Gate Array (FPGA) in the wireless communication system.

2. Description of Related Art

To meet a demand on wireless data traffic which has been in an increasing trend after a 4th Generation (4G) communication system was commercialized, there is an ongoing effort to develop an improved 5th Generation (5G) communication system or a pre-5G communication system. For this reason, the 5G communication system or the pre-5G communication system is called a beyond 4G network communication system or a post Long Term Evolution (LTE) system.

To achieve a high data rate, the 5G communication system is considered to be implemented in an mmWave band (e.g., such as a 60 GHz band). To reduce a propagation path loss at the mmWave band and to increase a propagation delivery distance, beamforming, massive Multiple Input Multiple Output (MIMO), Full Dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation, or the like are being developed in the 5G communication system.

In addition thereto, Hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

Recently, due to an increase in the number of antennas and an amount of data processed in the wireless communication system, it is required to use a multi-Field Programmable Gate Array (FPGA) in a control unit which is one of components of a base station. An operation of the multi-FPGA is accompanied by an increase in production cost and an increase in memory usage. Therefore, there is a need for an apparatus and method for efficiently operating the multi-FPGA.

SUMMARY

Based on the above discussion, the disclosure provides an apparatus and method for effectively operating a multi-Field Programmable Gate Array (FPGA) in a wireless communication system.

According to various embodiments of the disclosure, there is provided an apparatus of a base station in a wireless communication system. The apparatus includes a master Field Programmable Gate Array (FPGA), a plurality of slave FPGAs controlled by the master FPGA, and an address masker coupled to the master FPGA and the plurality of slave FPGAs. The address masker may be configured to receive different address bits assigned respectively to the plurality of slave FPGAs by the master FPGA, for the different address bits, mask bit values at a specific position with the same value, and transmit masked address bits corresponding respectively to the plurality of slave FPGAs.

According to various embodiments of the disclosure, there is provided a method of operating a base station in a wireless communication system. The base station includes a master FPGA, a plurality of slave FPGAs controlled by the master FPGA, and an address masker coupled to the master FPGA and the plurality of slave FPGAs. The method includes receiving, by the address masker, different address bits assigned respectively to the plurality of slave FPGAs by the master FPGA, for the different address bits, masking, by the address masker, bit values at a specific position with the same value, and transmitting, by the address masker, masked address bits corresponding respectively to the plurality of slave FPGAs.

According to various embodiments of the disclosure, an apparatus and method for effectively operating a multi-Field Programmable Gate Array (FPGA) are provided in a wireless communication system.

Technical problems to be achieved in the disclosure are not limited to the technical problems mentioned above, and other technical problems not mentioned herein may be clearly understood by those skilled in the art to which the disclosure pertains from the following descriptions.

DETAILED DESCRIPTION

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

The disclosure described below relates to an apparatus and method for operating a multi-Field Programmable Gate Array (FPGA) in a wireless communication system.

Terms used hereinafter to refer to a signal, a channel, control information, a message, network entities, a component of a device, or the like are exemplified for convenience of explanation. Therefore, the disclosure is not limited to the terms described below, and thus other terms have the same technical meaning may also be used.

In addition, although the disclosure describes various embodiments by using terms used in some communication standards (e.g., 3rd Generation Partnership Project (3GPP)), this is for exemplary purposes only. Various embodiments of the disclosure may be easily modified and applied to other communication systems.

Figure 1:
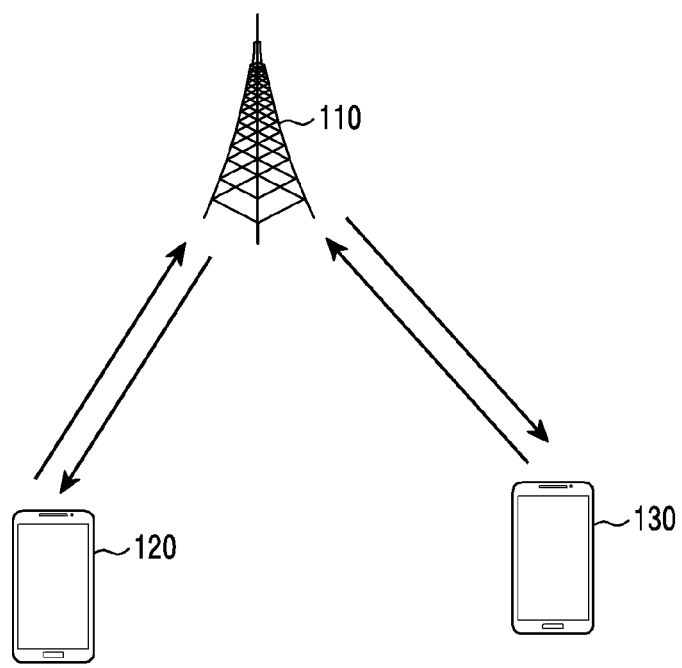
FIG. 1 illustrates a wireless communication system according to various embodiments of the disclosure.

FIG. 1 illustrates a wireless communication system according to various embodiments of the disclosure. As part of nodes which use a wireless channel in a wireless communication system, a base station 110, a terminal 120, and a terminal 130 are exemplified in FIG. 1. Although only one base station is illustrated in FIG. 1, another base station identical to or different from the base station 110 may be further included.

The base station 110 is a network infrastructure which provides a radio access to the terminals 120 and 130. The base station 110 has a coverage defined as a specific geographic region on the basis of a distance in which a signal is transmittable. In addition to the term 'base station', the base station 110 may be referred to as an 'Access Point (AP)', an 'eNodeB (eNB)', a '5th Generation (5G) node', a 'next generation nodeB (gNB)', a 'wireless point', a 'Transmission/Reception Point (TRP)', or other terms having equivalent technical meanings.

As a device used by a user, each of the terminals 120 and 130 communicates with the base station 110 through the wireless channel. Optionally, at least one of the terminals 120 and 130 may be operated without user involvement. That is, as a device for performing Machine Type Communication (MTC), at least one of the terminals 120 and 130 may not be carried by the user. In addition to the term 'terminal', each of the terminals 120 and 130 may be referred to as a 'User Equipment (UE)', a 'mobile station', a 'subscriber station', a 'remote terminal', a 'wireless terminal', a 'user device', or other terms having equivalent technical meanings.

Figure 2:
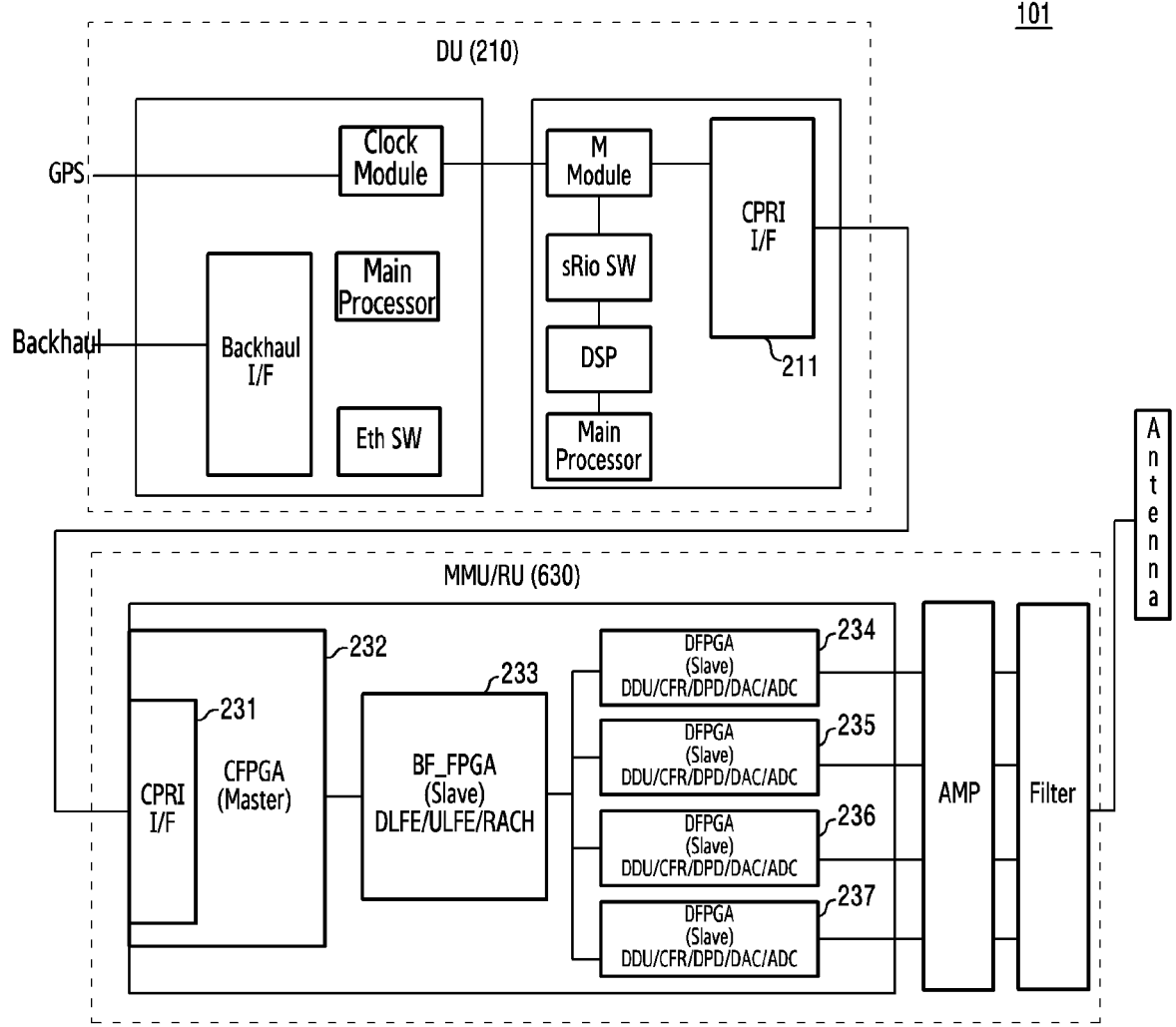
FIG. 2 illustrates a structure of a base station in a wireless communication system according to various embodiments of the disclosure.

FIG. 2 illustrates an example of a structure of a base station in a wireless communication system according to various embodiments of the disclosure.

A base station (or a nodeB) 200 includes structures of a Digital Unit (DU) 210 and Massive Multiple Input Multiple Output (MIMO) Unit (MMU)/Radio Unit (RU) 230. When power is supplied to the structure of the MMU/RU 230, an operation of an FPGA configuration (or config) (load) of a master FPGA 232 is performed by using an FPGA select map according to a booting order, and then slave PFGAs 233, 234, 235, 236, and 237 sequentially perform the operation of the FPGA config (load) operation.

The disclosure provides a digital logic for replacing a plurality of slave images existing respectively for the plurality of slave FPGAs 233, 234, 235, 236, and 237 with one slave image.

An example of the nodeB 200 in the wireless communication system includes the structures of the DU 210 and RU 230. In the nodeB, the DU 210 and the RU 230 perform Ethernet communication through Common Public Radio Interfaces (CPRIs) 211 and 231. The MMU/RU 230 includes at least one processor. The main processor 232 controls all addresses of the MMU/RU 230. The MMU 230 includes a function of a transmitter and receiver for wireless communication transmission. In addition to the main processor 232, examples of the processor may also include the baseband processor 233 (Downlink Front End (DLFE), Uplink Front End (ULFE), Random Access Channel (RACH)), the digital Intermediate Frequency (IF) processors 234, 235, 236, and 237 (Digital Downconverter/upconverter (DDUC), Crest Factor Reduction (CFR), Digital Pre-Distortion (DPD)), or the like.

Figure 3:
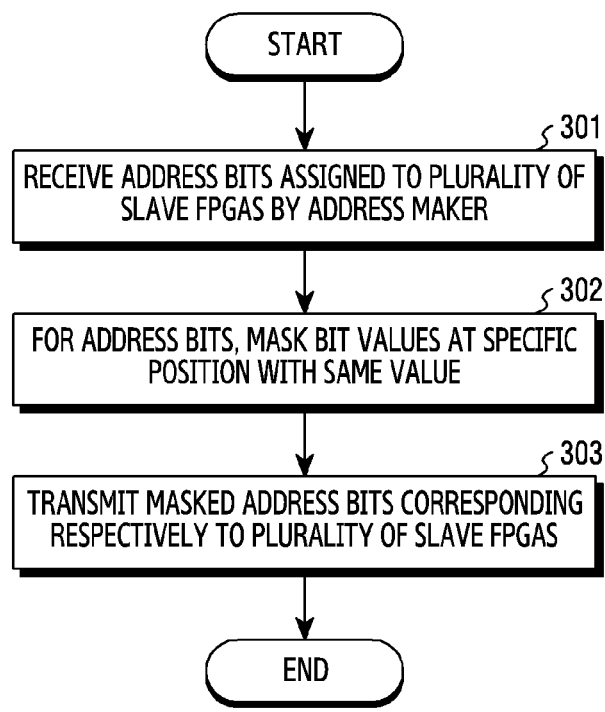
FIG. 3 illustrates a flowchart of a base station in a wireless communication system according to various embodiments of the disclosure.

FIG. 3 illustrates a flowchart of a base station in a wireless communication system according to various embodiments of the disclosure.

In the wireless communication system according to various embodiments of the disclosure, the base station includes a master FPGA, a plurality of slave FPGAs controlled by the master FPGA, and an address masker coupled to the master FPGA and the plurality of slave FPGAs.

In step 301, the base station receives different address bits assigned respectively to the plurality of slave FPGAs by the master FPGA, by using the address masker. According to an embodiment, in the different address bits, the remaining bit values other than bit values at a specific position are identical to each other.

In step 302, for the different address bits, the base station masks the bit values at the specific position with the same value by using the address masker. According to an embodiment, for the masked address bits, all bit values are identical to each other. According to an embodiment, for the masked address bits, all bit values are identical to address bits assigned by the master FPGA to one slave FPGA among the plurality of slave FPGAs.

In step 330, the base station transmits the masked address bits corresponding respectively to the plurality of slave FPGAs by using the address masker.

According to an embodiment, the base station further includes a memory. The base station stores a configuration bit for address bits of the master FPGA and a configuration bit for address bits assigned to the one slave FPGA. According to an embodiment, the configuration bit for the address bits assigned to the one slave FPGA corresponds to all of the plurality of slave FPGAs.

According to an embodiment, the base station performs masking by using the address masker, such that the same address bits are assigned to a plurality of slave FPGAs performing the same function, and different address bits are assigned to a plurality of slave FPGAs performing different functions.

According to an embodiment, the base station further includes a memory. The base station stores a configuration bit for address bits of the master FPGA and a configuration bit which is different for each function with respect to the plurality of slave FPGAs.

According to an embodiment, the base station transmits to the master FPGA an acknowledgement response received from the plurality of slave FPGAs with respect to address bits of a read or write operation assigned to the plurality of slave FPGAs from the master FPGA.

According to an embodiment, the base station generates an acknowledgement response by using the address masker if the acknowledgement response is not received for a specific time duration from the plurality of slave FPGAs with respect to address bits of a read or write operation assigned to the plurality of slave FPGAs from the master FPGA, and transmits the generated acknowledgement response to the master FPGA by using the address masker.

Figure 4:
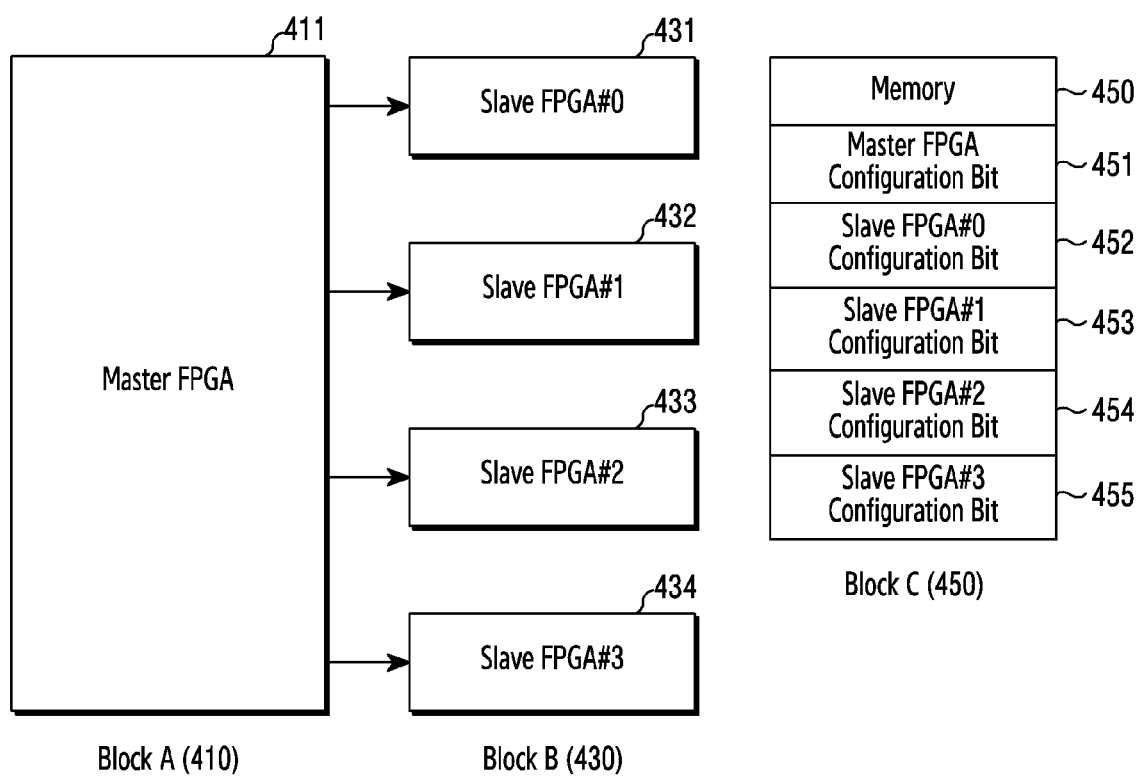
FIG. 4 illustrates an example of a structure of a base station including a multi-Field Programmable Gate Array (FPGA) in a wireless communication system.

FIG. 4 illustrates an example of a structure of a base station including a multi-FPGA in a wireless communication system.

Specifically, FIG. 4 is a block diagram for a hardware structure of a multi-FPGA system of a base station in a wireless communication system.

Referring to FIG. 4, the FPGA system of the base station includes a block A 410, a block B 430, and a block C 450.

The block A 410 corresponds to a master FPGA 411, and has a main processor. The block A 410 assigns an address to each of slave FPGAs 431, 432, 433, and 434. In addition, the block A 410 performs a control function with respect to each of the slave FPGAs 431, 432, 433, and 434 via an address interface.

The block B 430 corresponds to the slave FPGAs 431, 432, 433, and 434. Each of the slaves 431, 432, 433, and 434 corresponds to a slave FPGA performing the same function. Each of the slave FPGAs 431, 432, 433, and 434 is a digital circuit block which operates by being assigned a unique address.

The block C 450 is a block of a non-volatile memory (or a flash memory) 450 which stores unique FPGA configuration bits 451, 452, 453, 454, and 455 for the slave FPGAs 431, 432, 433, and 434.

Figure 5:
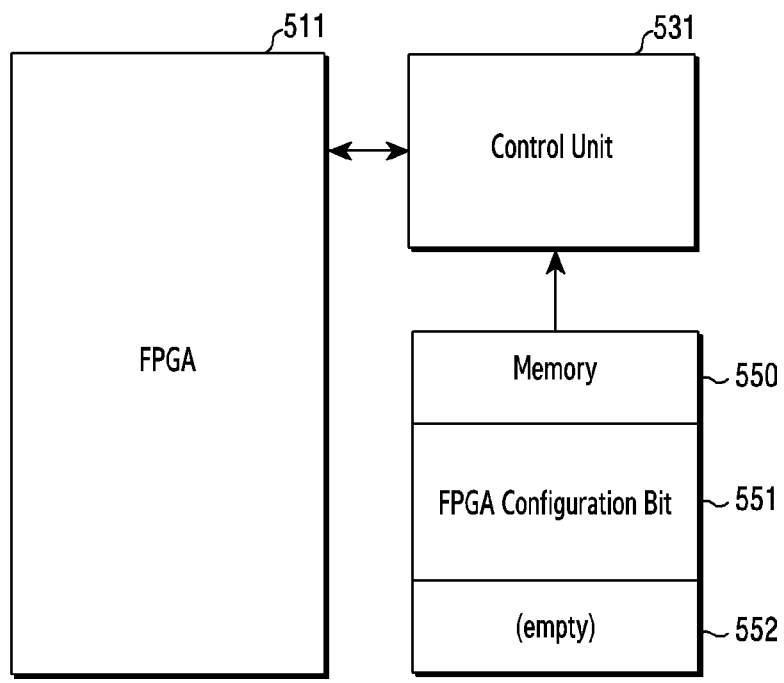
FIG. 5 illustrates an example of a structure of a base station including an FPGA in a wireless communication system.

FIG. 5 illustrates an example of a structure of a base station including an FPGA in a wireless communication system.

Specifically, FIG. 5 illustrates a hardware system block in which an FPGA and a non-volatile memory are configured in a typical base station.

Referring to FIG. 5, the base station includes an FPGA 511, a control unit 531, and a non-volatile memory (or a flash memory) 550.

The control unit 531 uses an FPGA configuration bit stored in the non-volatile memory 550 to perform an FPGA config (load) operation. When the base station is booted, the control unit 531 performs the FPGA config (load) operation on the corresponding FPGA 511, based on the FPGA configuration bit stored in the non-volatile memory 550.

Figure 6:
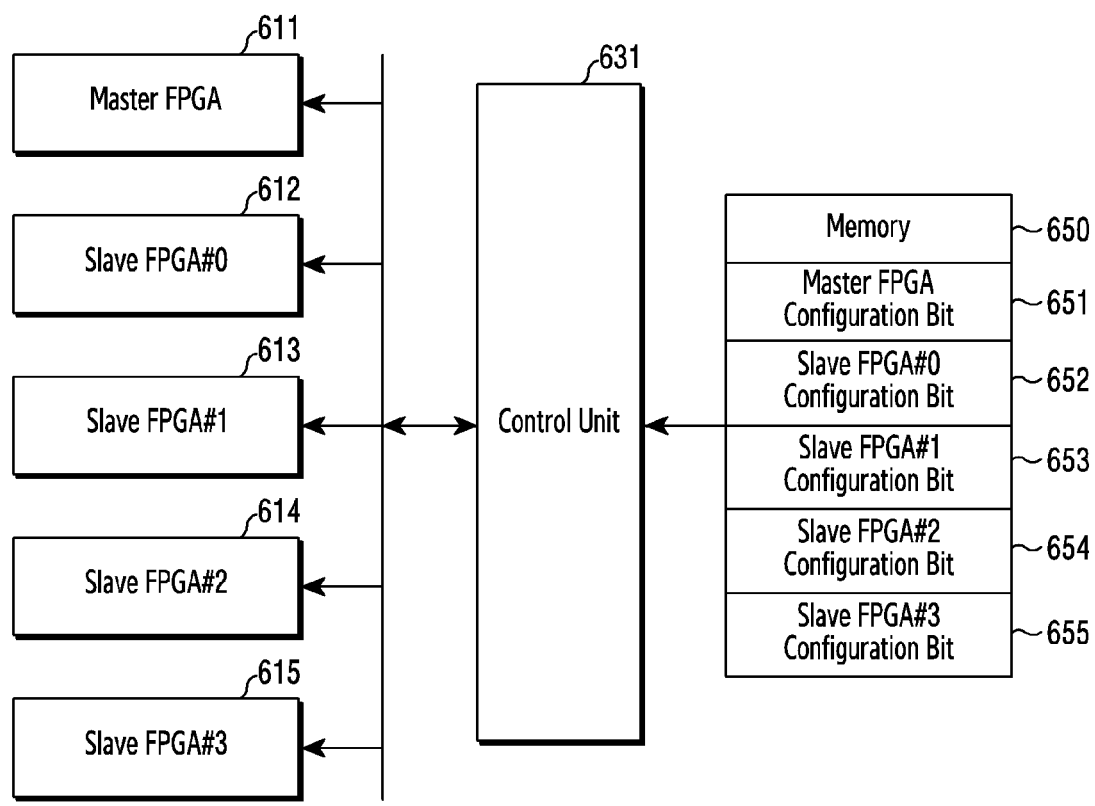
FIG. 6 illustrates an example of a structure of a base station including a multi-FPGA in a wireless communication system.

FIG. 6 illustrates an example of a structure of a base station including a multi-FPGA in a wireless communication system.

Specifically, FIG. 6 is a block diagram illustrating a structure of a base station which uses a multi-FPGA, with an increase in complexity of a hardware system structure of the base station in a wireless communication system of New Radio (NR) and Long Term Evolution (LTE).

When the base station is booted, a control unit 631 performs an FPGA config (load) operation, based on each of FPGA configuration bits 651, 652, 653, 654, and 655. The control unit 631 first performs the FPGA config (load) operation on a master FPGA 611 including a processor through a vender specification download, and then also performs the FPGA config (load) operation on slave FPGAs 612, 613, 614, and 615 sequentially through the vender specification download.

After the FPGA config (load) operation, the master FPGA 611 and each of the slave FPGAs 612, 613, 614, and 615 have unique addresses. Several configuration bits may exist due to the respective addresses.

An increase in the number of antennas and a capacity of a wireless communication system of NR, LTE, or the like results in an increase in a required capacity of a Digital Front End (DFE). Accordingly, a capacity of a slave FPGA implemented as the DFE is also increased.

If the master FPGA and the slave FPGA are integrated and implemented with one FPGA, a power consumption amount, a heating amount, cost, or the like is rapidly increased due to a required increase rate, which results in a decrease in efficiency. There is no FPGA satisfying a required increase rate of resources when the master FPGA and the slave FPGA are integrated and implemented with one FPGA.

Accordingly, in order to satisfy a requirement of the wireless communication system, it is necessary to configure the master FPGA and the several slave FPGAs. The number of slave FPGAs to be configured may be determined according to a required capacity increase rate of the DFE.

Figure 7:
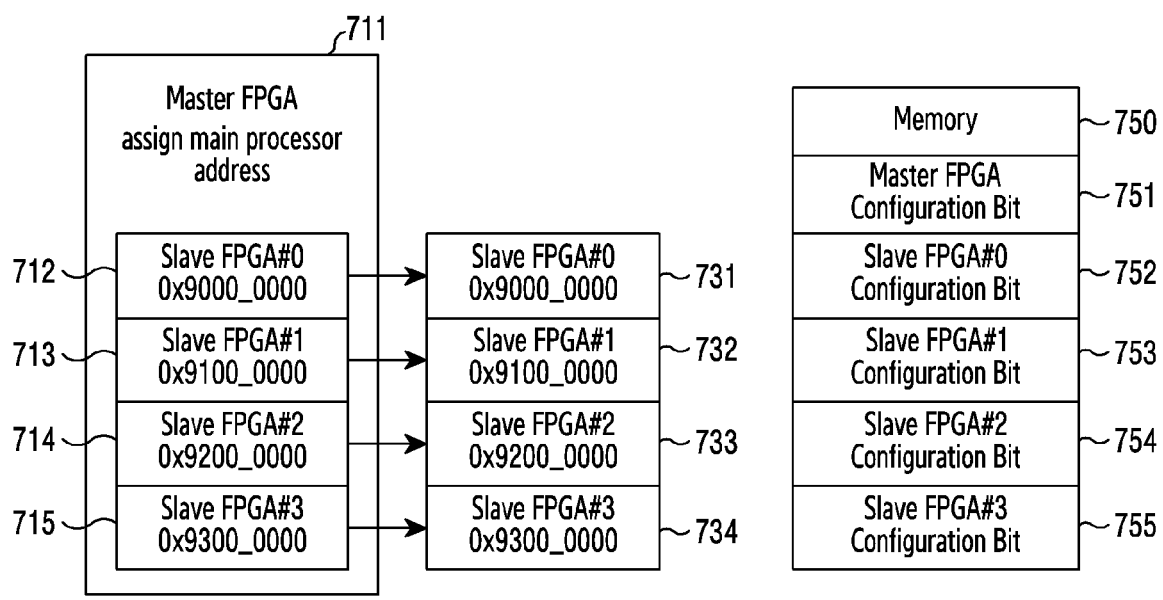
FIG. 7 illustrates an example of a structure of a base station including a multi-FPGA in a wireless communication system.

FIG. 7 illustrates an example of a structure of a base station including a multi-FPGA in a wireless communication system.

Specifically, FIG. 7 illustrates a structure of a master FPGA 711 and several slave FPGAs 712, 713, 714, and 715.

In order to control the slave FPGAs 712, 713, 714, and 715 performing the same DFE function, an address and a slave configuration bit exist for each of the slave FPGAs 712, 713, 714, and 715. Since a different address exists for each of the salve FPGAs 712, 713, 714, and 715, a space of a memory 750 is required to store configuration bits corresponding to the respective addresses.

Although the description of FIG. 7 is based on four slave FPGAs performing the same DFE function, this is for exemplary purposes only, and the number of slave FPGAs may be set differently according to the requirement. An increase in the requirement results in an increase in a management image and an increase in a required memory capacity, which may cause a problem of inefficiency in terms of a manufacturing time and cost for manufacturing a base station.

In order to solve the aforementioned problem in that the multi-FPGA configuration is inefficient since a separate FPGA address and FPGA configuration are configured for each slave FPGA, the disclosure provides an address mask for operating the same FPGA address and the same FPGA configuration. According to a method and apparatus using the address mask provided in the disclosure, it is expected to obtain efficiency by making a memory small in size and by producing and managing a single FPGA image, which is required to operate a multi-FPGA.

Figure 8:
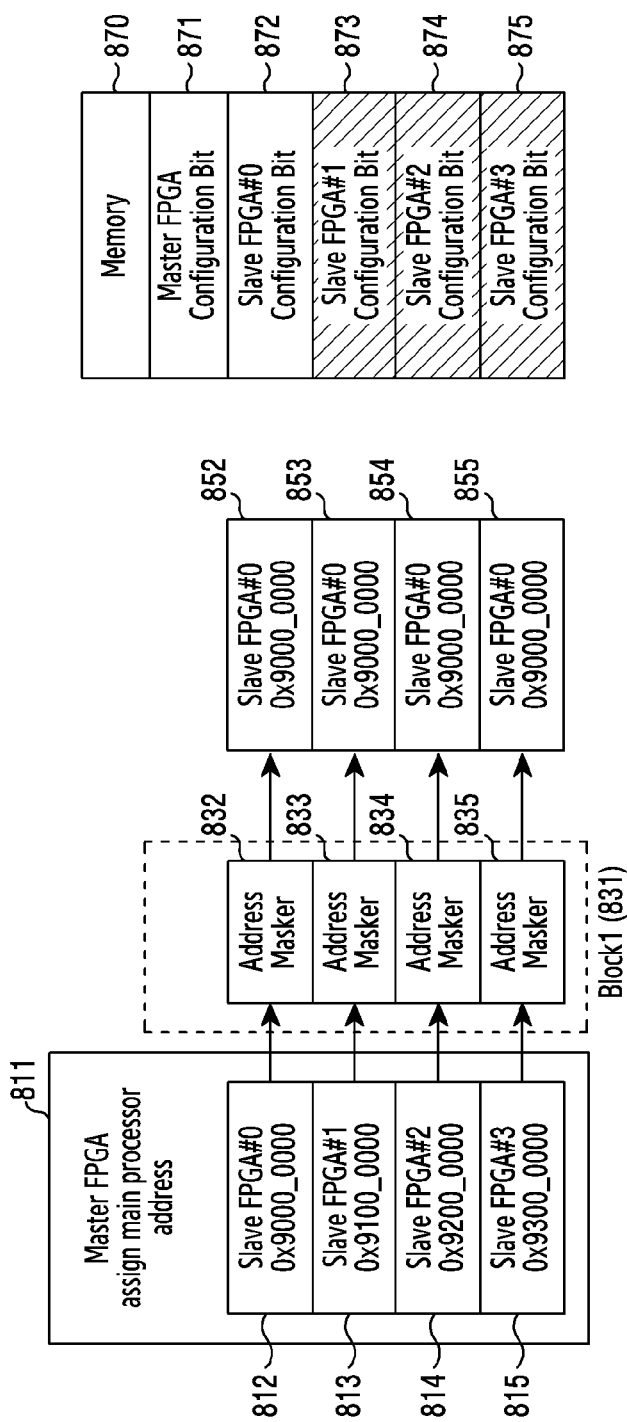
FIG. 8 illustrates an example of a structure of a base station including a multi-FPGA in a wireless communication system according to various embodiments of the disclosure.

FIG. 8 illustrates an example of a structure of a base station including a multi-FPGA in a wireless communication system according to various embodiments of the disclosure.

The structure of the base station according to various embodiments of the disclosure includes a block #1 831. The block #1 831 consists of address bits maskers 832, 833, 834, and 835 corresponding respectively to salve FPGAs 852, 853, 854, and 855.

The address bits maskers 832, 833, 834, and 835 mask offset bits of slave FPGAs 812, 813, 814, and 815 assigned by a master FPGA 811.

In addition, the address bits maskers 832, 833, 834, and 835 include a structure of a hang protection digital circuit device which generates an Acknowledgement (ACK) signal and returns it to the master FPGA 811 when the ACK signal is not received from at least one of the slave FPGAs 852, 853, 854, and 855 for a specific time duration.

A main processor of the master FPGA 811 assigns different address bits to the plurality of slave FPGAs 812, 813, 814, and 815 controlled by the master FPGA 811. The master FPGA 811 transmits to the address maskers 832, 833, 834, and 835 the different address bits assigned to the slave FPGAs 812, 813, 814, and 815.

The address maskers 832, 833, 834, and 835 mask bit values of a specific position with the same value with respect to different address bits received from the master FPGA 811. Although the masking is performed only on some bit values of the specific position, since the specific position at which the masking is performed is different for bit values in different address bits, all bit values are identical in masked address bits. In the masked address bits, all bit values are identical to address bits assigned by the master FPGA 811 to one slave FPGA 812 among the plurality of slave FPGAs 812, 813, 814, and 815.

The address maskers 832, 833, 834, and 835 transmit the masked address bits to the plurality of slave FPGAs 852, 853, 854, and 855 corresponding thereto. The plurality of slave FPGAs 812, 813, 814, and 815 and the plurality of slave FPGAs 852, 853, 854, and 855 are the same plurality of slave FPGAs.

A memory 870 may be constructed of a non-volatile memory. The memory stores different configuration bits for respective different address bits.

If there is no masking for the address bits, the memory 870 shall store a configuration bit 871 corresponding to the address of the master FPGA 811 and configuration bits 872, 873, 874, and 875 corresponding to different addresses of the plurality of slave FPGAs 852, 853, 854, and 855.

However, after masking is performed on the address bits, since all of the plurality of salve FPGAs 852, 853, 854, and 855 have the same address bits as the address bits assigned to the single slave FPGA 852, the memory 870 may store only the configuration bit 871 for the address of the master FPGA 870 and the configuration bit 872 corresponding to the address of the single slave FPGA 852. The configuration bit 872 corresponding to the address of the single slave FPGA 852 corresponds to all of the slave FPGAs 852, 853, 854, and 855.

Therefore, the memory may save a storage capacity of the configuration bits 873, 874, and 875 for the slave FPGAs 853, 854, and 855. In addition, a time required to make the configuration bits 873, 874, 875 for the slave FPGAs 853, 854, and 855 may be saved.

Hereinafter, an address masker for operating the same FPGA address and same FPGA configuration for four slave FPGAs as shown in FIG. 8 is described with reference to FIG. 9 to FIG. 15.

Figure 9:
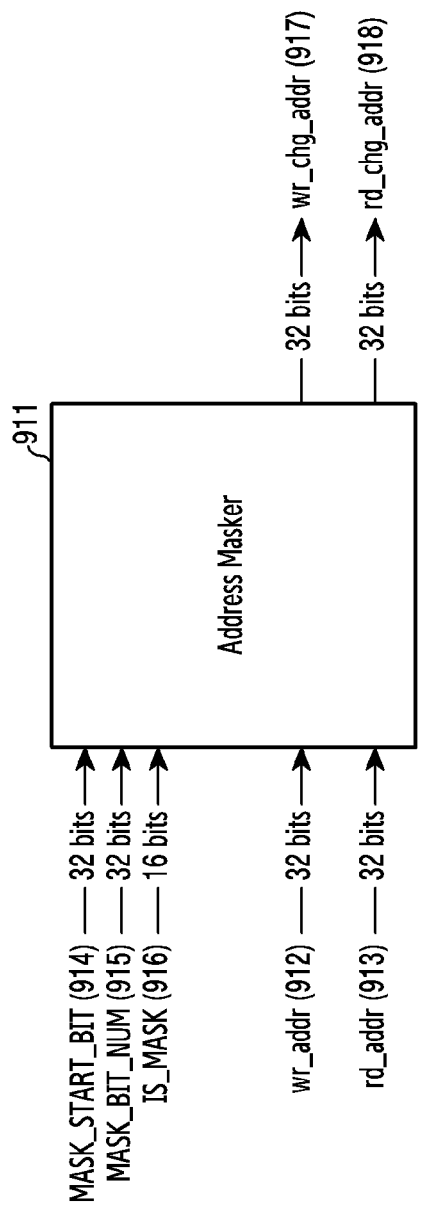
FIG. 9 illustrates an example of an address masker in a wireless communication system according to various embodiments of the disclosure.

FIG. 9 illustrates an example of an address masker in a wireless communication system according to various embodiments of the disclosure.

Specifically, FIG. 9 illustrates a definition on a basic input port and output port of an address masker 911.

Referring to FIG. 9, the input port of the address masker 911 includes wr_addr 912, rd_addr 913, MASK_START_BIT 914, MASK_BIT_NUM 915, and IS_MASK 916, and the output port of the address masker 911 includes wr_chg_addr 917 and rd_chg_addr 918.

Specifically, the wr_addr 912 is an address used in a write operation, and consists of 32 bits. The rd_addr 913 is an address used in a read operation, and consists of 32 bits. The MASK_START_BIT 914 indicates a position of a mask start bit based on a Most Significant Bit (MSB), and consists of 32 bits. The MASK_BIT_NUM 915 indicates a valid masking bit number based on the mask start bit, and consists of 32 bits. The IS_MASK 916 is an indicator indicating whether an address mask is enabled, and consists of 1 bit.

In addition, the wr_chg_addr 917 is an address applied to masking used in the write operation, and consists of 32 bits. The rd_chg_addr 918 is an address applied to masking used in the read operation, and consists of 32 bits.

An example of a configuration for the address masker for operating the same FPGA address and same FPGA configuration for the four slave FPGAs as shown in FIG. 8 is as follows.

Example

IS_MASK: '1'
MASK_START_BIT: '25'
MASK_BIT_NUM: '2'
MSB((Most Significant Bit), LSB(Least Significant Bit)

Figure 10:
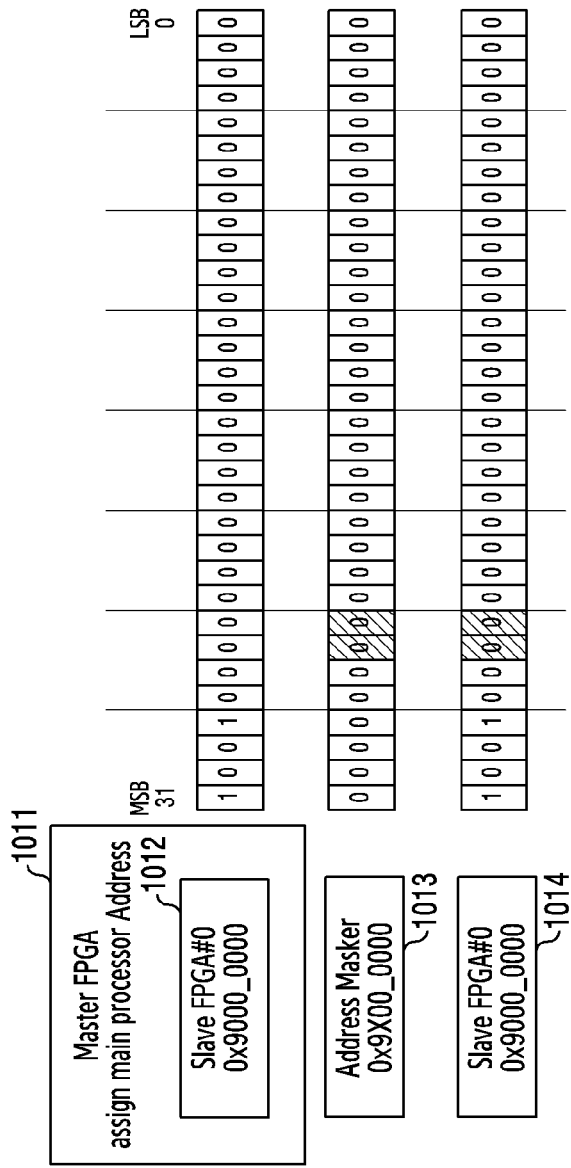
FIG. 10 illustrates an example of a process of performing bit masking on an assigned address for a multi-FPGA in a wireless communication system according to various embodiments of the disclosure.

FIG. 10 illustrates an example of a process of performing bit masking on an assigned address for a multi-FPGA in a wireless communication system according to various embodiments of the disclosure.

Figure 11:
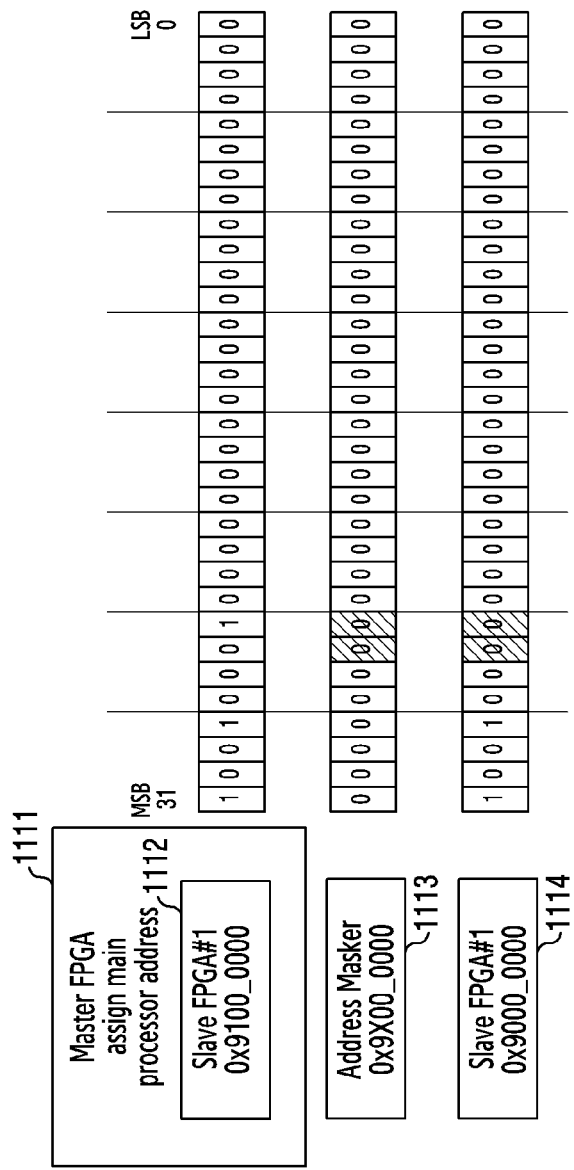
FIG. 11 illustrates an example of a process of performing bit masking on an assigned address for a multi-FPGA in a wireless communication system according to various embodiments of the disclosure.

Specifically, FIG. 10 illustrates a process of performing bit masking on an assigned address of a master FPGA 1011 and slave FPGA #0 1012 and 1014, as an example of a configuration for an address masker for operating the same FPGA address and same FPGA configuration for four slave FPGAs in FIG. 11.

The master FPGA 1011 assigns an address 0x9000_0000 to the slave FPGA #0 1012 via a processor interface. 0x9000_0000 is a reference configuration bit of a single slave FPGA. The master FPGA 1011, an address masker 1013, and the slave FPGAs #0 1012 and 1014 use a bit address of 32 bits in total.

The address masker 1013 configures and operates a range of a masking bit to be used in the same manner as in each slave FPGA.

The total number of slave FPGAs configured as an example in FIG. 8 is 4. If at least two bits are masked, it is possible to operate the same FPGA address and the same FPGA configuration.

Bits #24 and #25 indicated by shades in FIG. 10 correspond to two bits used in masking.

In order for the main processor of the master FPGA 1011 to access the salve FPGAs #0 1012 and 1014, the address masker 1013 is added to the address 0x9000_0000. Since the address masker 1013 masks the bits #24 and 25 to "00" at the address 0x9000_0000 of the slave FPGAs #0 1012 and 1014, the slave FPGAs #0 1012 and 1014 use the same address 0x9000_0000 and use a corresponding configuration bit.

FIG. 11 illustrates an example of a process of performing bit masking on an assigned address for a multi-FPGA in a wireless communication system according to various embodiments of the disclosure.

Specifically, FIG. 11 illustrates a process of performing bit masking on an assigned address of a master FPGA 1111 and slave FPGA #1 1112 and 1114, as an example of a configuration for an address masker for operating the same FPGA address and same FPGA configuration for four slave FPGAs in FIG. 11.

The master FPGA 1111 assigns an address 0x9100_0000 to the slave FPGAs #1 1112 and 1114 via a processor interface. The master FPGA 1111, an address masker 1113, and the slave FPGAs #1 1112 and 1114 use a bit address of 32 bits in total.

The address masker 1113 configures and operates a range of a masking bit to be used in the same manner as in each slave FPGA.

The total number of slave FPGAs configured as an example in FIG. 8 is 4. If at least two bits are masked, it is possible to operate the same FPGA address and the same FPGA configuration.

Bits #24 and #25 indicated by shades in FIG. 11 correspond to two bits used in masking.

In order for the main processor of the master FPGA 1111 to access the salve FPGAs #1 1112 and 1114, the address masker 1113 is added to the address 0x9100 _0000. Since the address masker 1113 masks the bits #24 and 25 to "00" at the address 0x9100_0000 of the slave FPGAs #1 1112 and 1114, the slave FPGAs #1 1112 and 1114 use the same address as the slave FPGA #0 1311 and use a corresponding configuration bit.

In practice, an access address for the salve FPGA #1 1112 and 1114 of the master FPGA 1111 is 0x9100_0000, but an address used by the salve FPGAs #1 1112 and 1114 is 0x9000_0000.

Figure 12:
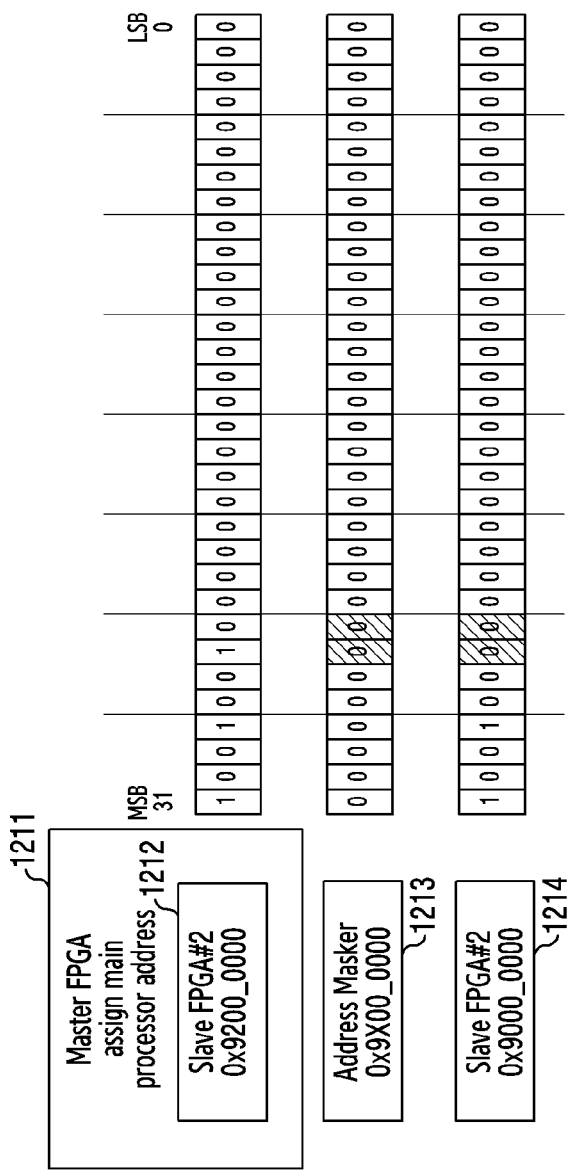
FIG. 12 illustrates an example of a process of performing bit masking on an assigned address for a multi-FPGA in a wireless communication system according to various embodiments of the disclosure.

FIG. 12 illustrates an example of a process of performing bit masking on an assigned address for a multi-FPGA in a wireless communication system according to various embodiments of the disclosure.

Specifically, FIG. 12 illustrates a process of performing bit masking on an assigned address of a master FPGA 1211 and slave FPGA #2 1212 and 1214, as an example of a configuration for an address masker for operating the same FPGA address and same FPGA configuration for four slave FPGAs in FIG. 11.

The master FPGA 1211 assigns an address 0x9200_0000 to the slave FPGAs #2 1212 and 1214 via a processor interface. The master FPGA 1211, an address masker 1213, and the slave FPGAs #2 1212 and 1214 use a bit address of 32 bits in total.

The address masker 1213 configures and operates a range of a masking bit to be used in the same manner as in each slave FPGA.

The total number of slave FPGAs configured as an example in FIG. 8 is 4. If at least two bits are masked, it is possible to operate the same FPGA address and the same FPGA configuration.

Bits #24 and #25 indicated by shades in FIG. 12 correspond to two bits used in masking.

In order for the main processor of the master FPGA 1211 to access the salve FPGAs #2 1212 and 1214, the address masker 1213 is added to the address 0x9200_0000. Since the address masker 1213 masks the bits #24 and 25 to "00" at the address 0x9200_0000 of the slave FPGAs #2 1212 and 1214, the slave FPGAs #2 1212 and 1214 use the same address as the slave FPGA #0 1314 and use a corresponding configuration bit.

In practice, an access address for the salve FPGA #2 1212 and 1214 of the master FPGA 1211 is 0x9200_0000, but an address used by the salve FPGAs #2 1212 and 1214 is 0x9000_0000.

Figure 13:
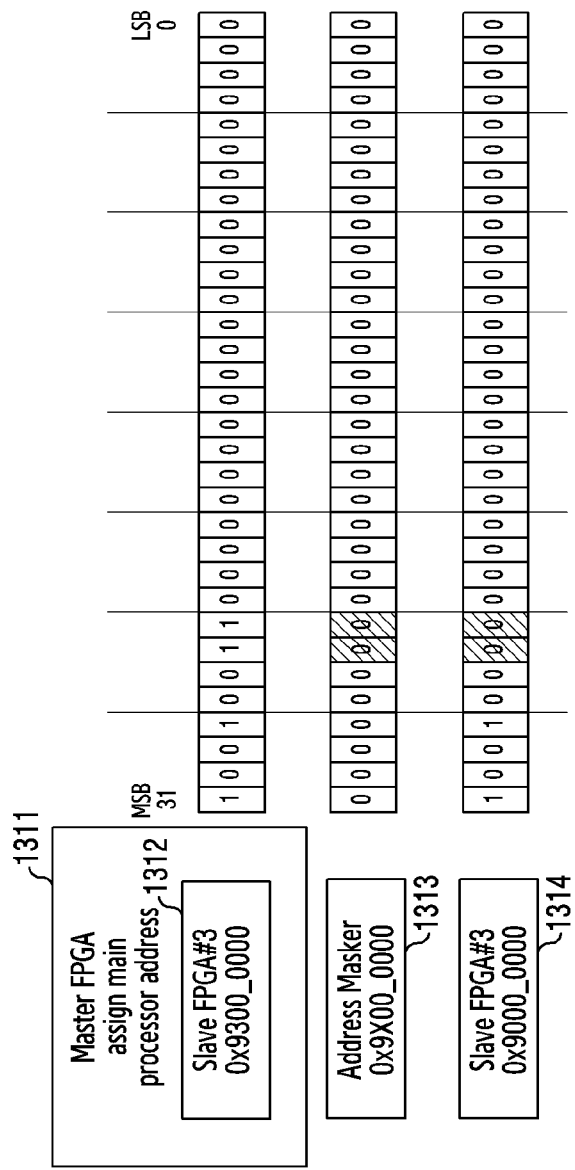
FIG. 13 illustrates an example of a process of performing bit masking on an assigned address for a multi-FPGA in a wireless communication system according to various embodiments of the disclosure.

FIG. 13 illustrates an example of a process of performing bit masking on an assigned address for a multi-FPGA in a wireless communication system according to various embodiments of the disclosure.

Specifically, FIG. 13 illustrates a process of performing bit masking on an assigned address of a master FPGA 1311 and slave FPGA #3 1312 and 1314, as an example of a configuration for an address masker for operating the same FPGA address and same FPGA configuration for four slave FPGAs in FIG. 11.

The master FPGA 1311 assigns an address 0x9300_0000 to the slave FPGAs #3 1312 and 1314 via a processor interface. The master FPGA 1311, an address masker 1313, and the slave FPGAs #3 1312 and 1314 use a bit address of 32 bits in total.

The address masker 1313 configures and operates a range of a masking bit to be used in the same manner as in each slave FPGA.

The total number of slave FPGAs configured as an example in FIG. 8 is 4. If at least two bits are masked, it is possible to operate the same FPGA address and the same FPGA configuration.

Bits #24 and #25 indicated by shades in FIG. 13 correspond to two bits used in masking.

In order for the main processor of the master FPGA 1311 to access the salve FPGAs #3 1312 and 1314, the address masker 1313 is added to the address 0x9300_0000. Since the address masker 1313 masks the bits #24 and 25 to "00" at the address 0x9300_0000 of the slave FPGAs #3 1312 and 1314, the slave FPGAs #3 1312 and 1314 use the same address as the slave FPGA #0 1314 and use a corresponding configuration bit.

In practice, an access address for the salve FPGA #3 1312 and 1314 of the master FPGA 1311 is 0x9300_0000, but an address used by the salve FPGAs #3 1312 and 1314 is 0x9000_0000.

Four slave FPGA addresses in total may be replaced with one identical slave FPGA address through the method described above with reference to FIG. 10 to FIG. 13. In addition, one identical configuration bit may be used for the four slave FPGAs in total.

Figure 14:
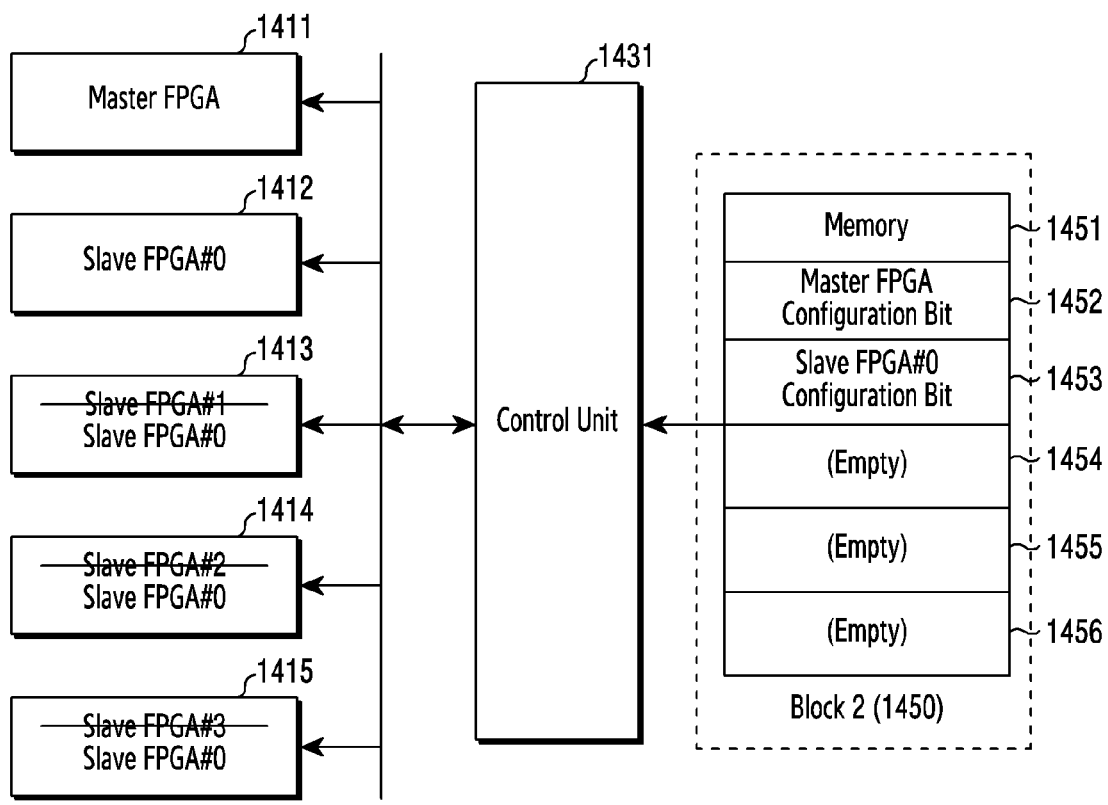
FIG. 14 illustrates an example of a process of using the same configuration bit for a multi-FPGA in a wireless communication system according to various embodiments of the disclosure.

FIG. 14 illustrates an example of a process of using the same configuration bit for a multi-FPGA in a wireless communication system according to various embodiments of the disclosure.

Referring to FIG. 14, a salve FPGA #0 1412, a slave FPGA #1 1413, a slave FPGA #2 1414, and a slave FPGA #3 1415 have the same address assigned by an address mask and use the same configuration bit. Therefore, a configuration bit of the slave FPGA #1 1413 may be replaced with a configuration bit of the slave FPGA #0 1412 under the control of a control unit 1431 which loads the slave FPGA. In the same manner, the configuration bits of the salve FPGA #2 1414 and slave FPGA #3 1415 may be replaced with the configuration bit of the slave FPGA #0 1412.

This method has an advantage in that a capacity of a non-volatile memory (or a flash memory) 1451 of a block #2 1450 is reduced by at least half. That is, capacities 1454, 1455, and 1456 of the memory 1451 which may be used for the slave FPGA #1 1413, the slave FPGA #2 1414, and the slave FPGA #3 1415 may not be used.

The configuration for the address masker for operating the same FPGA address and same FPGA configuration for four slave FPGAs in FIG. 8 is exemplified above with reference to FIG. 10 to FIG. 14.

The method according to various embodiments of the disclosure is more effective to equalize the address and structure of the slave FPGA when the capacity of the DEF increases.

The equalization is generalized as shown in the following equation.

$$[\text{Max\_Add\_Bits}-1 : \text{Mask\_Start\_Bits}] \&\& [\text{Mask\_Start\_Bits}-1 : \{[\text{Mask\_start Bits}-1] - [\text{Mask\_Bits\_Num}+1]\} \&\& \text{Remain\_Bits}] \quad \text{Equation 1}$$

Herein, Max_Add_Bits denotes maximum process address bits, Mask_Start_Bit denotes masking start bits based on a Most Significant Bit (MSB), Mask_Bits_Num denotes a valid masking bit number based on the mask start bit, and Remain_Bits denotes the remaining bits other than the masking bits in Max_Add_Bits. The Max_Add_Bits may be variously configured to, for example, 32, 64, and 128 bits. The Mask_Start_Bits may be variously configured according to an access region size of the salve FPGA. The Mask_Bits_Num may be configured by the common number of the same slave FPGAs.

Figure 15:
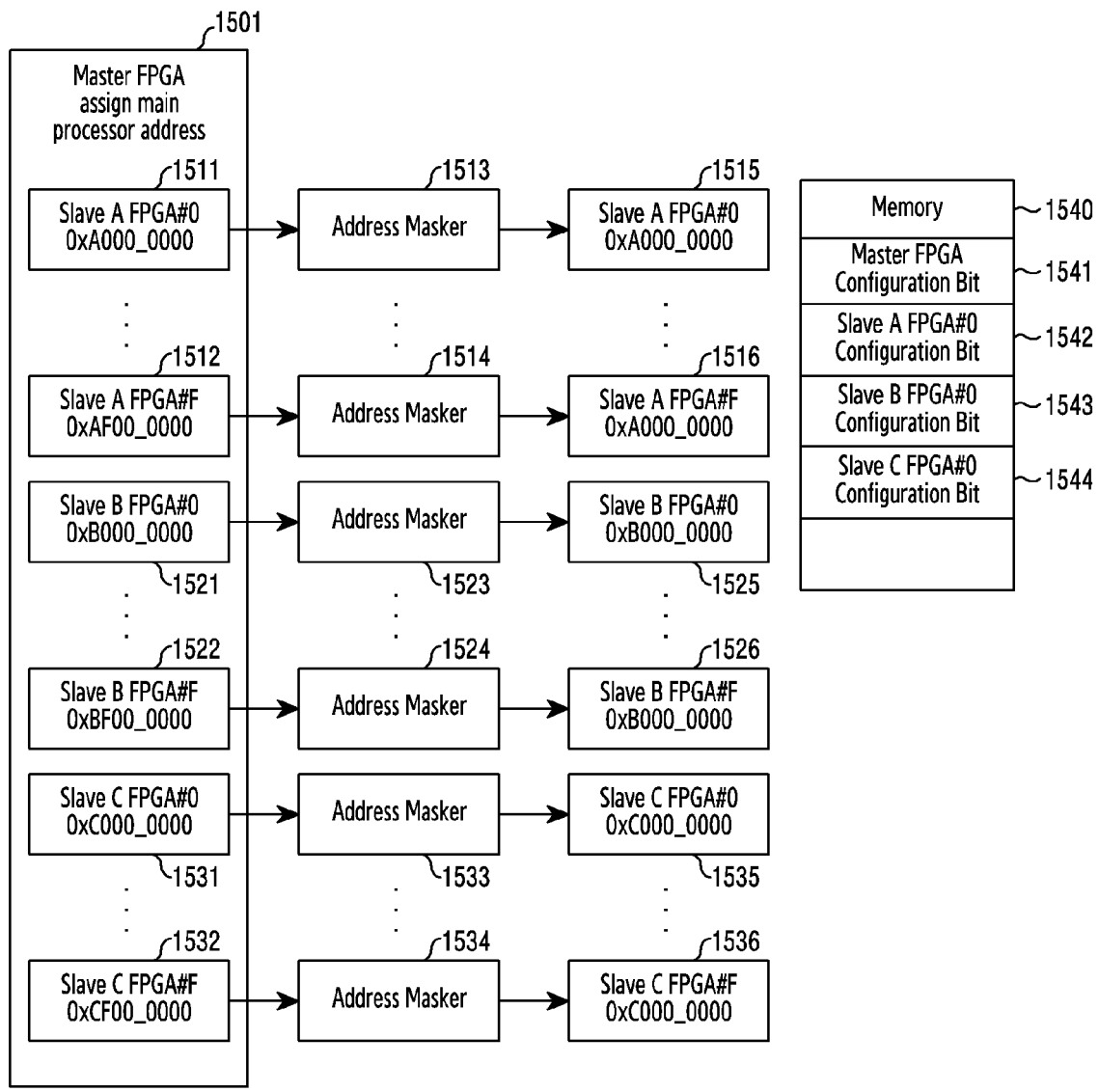
FIG. 15 illustrates an example of a process of assigning a different bit to each of a plurality of groups of a multi-FPGA in a wireless communication system according to various embodiments of the disclosure.

FIG. 15 illustrates an example of a process of assigning a different bit to each of a plurality of groups of a multi-FPGA in a wireless communication system according to various embodiments of the disclosure.

Figure 16:
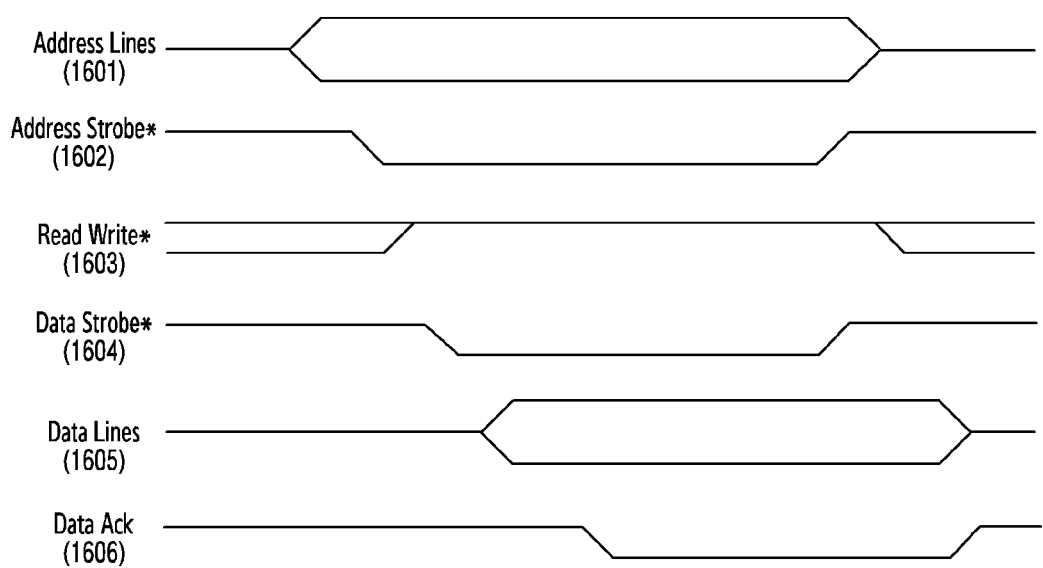
FIG. 16 illustrates an example of a bus cycle for a read and write operation of a processor of a base station in a wireless communication system.

A process of performing address masking by grouping a plurality of slave FPGAs for each function to be executed is illustrated in FIG. 16, by extending the process described above with reference to FIG. 10 to FIG. 14.

Referring to FIG. 15, different addresses and bits are assigned to all slave FPGAs 1511, 1512, 1521, 1522, 1531, and 1532 by a main processor of a master FPGA. That is, even if the same function A is performed, the slave A FPGA #0 1511 and the salve A FPGA #F 1512 are assigned different addresses and use different configuration bits. In addition, even if the same function B is performed, the salve B FPGA #0 1521 and the salve B FPGA #F 1522 are assigned different addresses and use different configuration bits. In addition, even if the same function C is performed, the slave C FPGA #0 1531 and the salve C FPGA #F 1532 are assigned different addresses and use different configuration bits.

For the plurality of slave FPGAs 1511 and 1512 performing the function A, the plurality of slave FPGAs 1521 and 1522 performing the function B, and the plurality of slave FPGAs 1531 and 1532 performing the function C, address maskers 1513, 1514, 1523, 1524, 1533, and 1534 assign different bits for respective bits. Accordingly, the slave FPGAs performing the same function are assigned the same address and use the same configuration bit. In addition, the slave FPGAs performing different functions are assigned different addresses and use different configuration bits.

Since the same FPGA configuration bit is used for each function, a capacity of a memory 1540 may be saved by the number of slave FPGAs performing the same function.

A hang protection function which generates and returns an ACK signal to a master FPGA when the ACK signal is not received from a slave FPGA for a specific time duration is described below with reference to FIG. 16 to FIG. 18 in order to prevent an error in which a processor stops in a processor interface between the master FPGA and each slave FPGA.

FIG. 16 illustrates an example of a bus cycle for a read and write operation of a processor of a base station in a wireless communication system.

Specifically, FIG. 16 illustrates a process bus cycle for a read and write operation in a typical Central Processing Unit (CPU). In the disclosure, the CPU of FIG. 16 may correspond to a main processor of a master FPGA.

Referring to FIG. 16, in case of a read or write address 1603, the typical CPU operates by transmitting a data ACK 1606 as a response. However, if an operation of a data response is not performed due to a read or write address error or other reasons, the CPU continues to wait for the response and thus does not perform another operation. That is, in the disclosure, if the master FPGA does not receive the data response from any one of a plurality of slave FPGAs which use the same address through address masking, the main processor of the master FPGA continues to wait for the response and thus does perform another operation.

Specifically, the processor is basically configured to perform a CPU Interface (I/F) function or a CPU I/F read/write function.

When the processor is in a write mode, an address 1601 and an address strobe 1602 (low) are activated, and a read write 1603 transitions to a low state. The data line 1605 and data strobe 1604 (low) assigned to an address are activated and transmitted. The processor receives a data ACK 1606 (low) indicating whether data is received properly at a later time.

When the processor is in a read mode, the address 1601 and the address strobe 1602 (low) are activated, and the read write 1603 transitions to a high state. The data line 1605 and data strobe 1604 (low) assigned to an address are activated and transmitted. The processor receives the data ACK 1606 (low) indicating whether data is transmitted properly at a later time.

Since the plurality of slave FPGAs are used, when any one of salve FPGA is defective or does not operate, ACK may not be received even if the main processor of the master FPGA transmits an address. In this case, the main process of the master FPGA is not able to give another command for the plurality of slave FPGAs.

In order to solve this problem, the disclosure provides hang protection in which an address masker block between the master FPGA and the plurality of slave FPGAs generates an ACK signal and transmits the ACK signal to the master FPGA, so that other slave FPGAs, except for slave FPGAs which are defective or do not operate, continue to perform a normal operation.

Accordingly, the disclosure provides a method and apparatus for performing the hang protection function together with the address masking.

Figure 17:
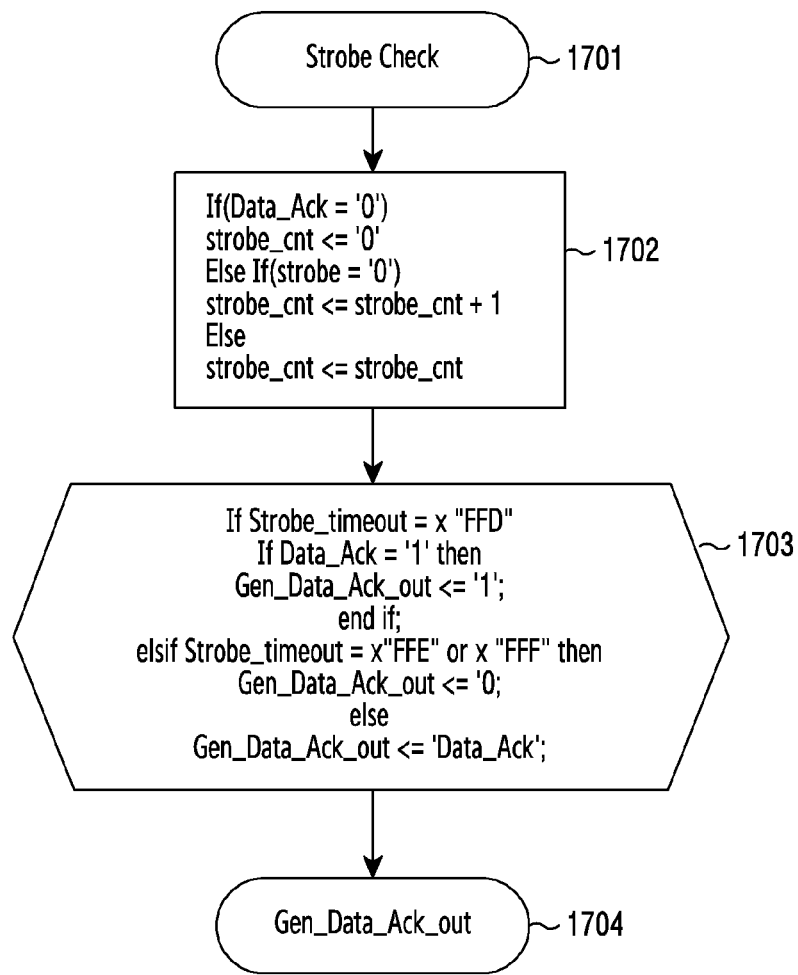
FIG. 17 illustrates a flowchart of an operation of a base station in a wireless communication system according to various embodiments of the disclosure.

FIG. 17 illustrates a flowchart of an operation of a base station in a wireless communication system according to various embodiments of the disclosure.

Specifically, FIG. 17 illustrates a flowchart of a process of performing hang protection for a read or write operation.

When an address for read or write is accessed, a main processor of a master FPGA may transmit an address and a strobe to a plurality of slave FPGAs, and receives data ACK in response thereto.

In step 1701, an address masker block between the master FPGA and the plurality of slave FPGAs monitors the strobe.

In step 1702, the address masker block counts a time for which a data ACK response does not occur from the plurality of slave FPGAs as a result of monitoring the strobe.

In step 1703, if the data ACK response does not occur from the plurality of slave FPGAs for a specific time duration, the address masker block generates a data ACK response signal, instead of the plurality of FPGAs. According to an embodiment, the specific time may be determined to be operation clock*x"FFD".

According to the aforementioned process, the hang protection is achieved in the master FPGA at the occurrence of a connection error of the slave FPGA, a device defect, or an error related to the salve FPGA.

Figure 18:
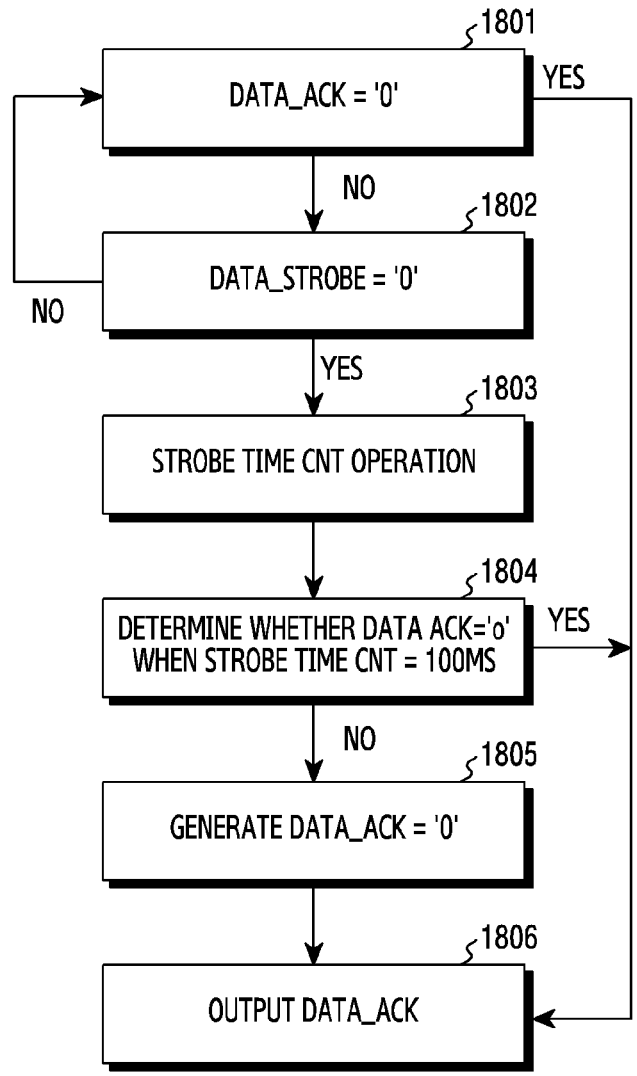
FIG. 18 illustrates a flowchart of an operation of a base station in a wireless communication system according to various embodiments of the disclosure.

FIG. 18 illustrates a flowchart of an operation of a base station in a wireless communication system according to various embodiments of the disclosure.

Specifically, FIG. 18 illustrates a flowchart representing the process of FIG. 17 in detail.

In step 1801, an address masker block determines whether a value of DATA_ACK is 0 as a result of monitoring a strobe. If DATA_ACK=0, it means that an output is performed with a normal operation of a slave FPGA. If it is determined that the slave FPGA operates normally as a result of performing the 1801, DATA_ACK is output from the slave FPGA through step 1806. If it is determined that the salve FPGA operates abnormally as a result of performing the step 1801, step 1802 is performed.

In the 1802, the address masker block determines whether a value of DATA_Strobe is 0. If the value of DATA_Strobe is 0 as a result of performing the step 1802, step 1083 is performed. If the value of DATA_Strobe is not 0 as a result of performing the step 1802, that is, if DATA_Strobe=1, the address masker block performs the step 1801 again to perform initialization.

In the step 1803, the address masker block performs a strobe time count (strobe time cnt) operation. That is, the address masker block counts a time for which a data ACK response does not occur from the plurality of slave FPGAs as a result of monitoring the strobe.

In step 1804, the address masker block determines whether a value of DATA_ACK is 0 when the strobe time cnt is 100 ms. If DATA_ACK=0 as a result of performing the step 1804, it is determined that the slave FPGA operates normally, and DATA_ACK is output from the slave FPGA through the step 1806. If it is determined that the slave FPGA operates abnormally as the result of performing the step 1804, step 1805 is performed.

In the step 1805, the address masker block generates a signal of DATA_ACK=0. That is, the address masker block generates DATA_ACK, instead of the slave FPGA. According to an embodiment, the address masker block generates DATA_ACK when the strobe time cnt is 100.1 ms.

In the step 1806, the address masker block outputs the DATA_ACK. The address masker block transmits to the master FPGA the DATA_ACK of the salve FPGA which operates normally or the DATA_ACK generated instead by the address masker block in the operation 1805.

TABLE 1

| | FPGA Logic resource | | | |
|---|---|---|---|---|
| | LUT | Register | BRAM36K | DSP48 |
| Address Mask (1 unit) | 109 | 101 | 0 | 0 |

Table 1 above represents an FPGA resource designed for an address masker when a multi-FPGA configuration operates with the same address and the same configuration according to various embodiments of the disclosure.

In an example of MMU 64T64R(64Tx and 64 Rx) for an LTE wireless communication system, a throughput capacity for one DFE_FPGA is designed to be 8T8R(8Tx and 8Rx), and 8 DFE_FPGAs are used in total to implement the 64T64R. A configuration bit size of the DFE_FPGA used in the MMU is 7.91 MB, and about 7 hours are required for each DFE_FPGA to make a configuration bit.

According to the conventional method of implementing the multi-FPGA, a 'config memory size' is 7.91 MB*8 (DFE_FPGA count)=63.28 MB, and a 'config bit made time' is about 7 hours*8(DFE_FPGA count)=56 hours (@ server unit).

According to various embodiments of the disclosure, the config memory size is 7.91MB*1(the same DFP_FPGA)= 7.91 MB, and the config bit made time is about 7 hours (DFE_FPGA)=hours (@ server unit).

Therefore, according to various embodiments of the disclosure, a required capacity of a non-volatile memory and a configuration bit made time may be reduced by 12.5% in total, which is efficient compared to the conventional method.

In an example of MMU 32T32R(32Tx and 32 Rx) for an NR wireless communication system, a throughput capacity for one DFE_FPGA is designed to be 8T8R(8Tx and 8Rx), and 4 DFE_FPGAs are used in total to implement the 32T32R. A configuration bit size of the DFE_FPGA used in the NR MMU is 7.25 MB, and about 3.5 hours are required for each DFE_FPGA to make a configuration bit.

According to the conventional method of implementing the multi-FPGA, the config memory size is 7.25 MB*4 (DFE_FPGA count)=29 MB, and the config bit made time is about 3.5 hours*4(DFE_FPGA count)=14 hours (@ server unit).

According to various embodiments of the disclosure, the config memory size is 7.25 MB*1(the same DFP_FPGA)= 7.25 MB, and the config bit made time is about 3.5 hours (DFE_FPGA)=3.5 hours (@ server unit).

Therefore, according to various embodiments of the disclosure, a required capacity of a non-volatile memory and a configuration bit made time may be reduced by 25% in total, which is efficient compared to the conventional method.

In addition, according to various embodiments of the disclosure, there is an advantage in that an access of a processor of a main FPGA is possible through a hang protection process even if a slave FPGA has an error.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have an access to a device for performing an embodiment of the disclosure via an external port. In addition, an additional storage device on a communication network may have an access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The disclosure relates in general to a wireless communication system, and in particular to an apparatus and method for operating a multi-Field Programmable Gate Array (FPGA) in the wireless communication system.

Recently, due to an increase in the number of antennas and an amount of data processed in the wireless communication system, it is required to use a multi-FPGA in a control unit which is one of components of a base station. An operation of the multi-FPGA is accompanied by an increase in production cost and an increase in memory usage. Therefore, there is a need for an apparatus and method for efficiently operating the multi-FPGA.

The invention claimed is:

1. A base station in a wireless communication system, the base station comprising:
a master Field Programmable Gate Array (FPGA);
a plurality of slave FPGAs controlled by the master FPGA; and
an address masker coupled to the master FPGA and the plurality of slave FPGAs,
wherein the address masker is configured to:
receive different address bits assigned respectively to the plurality of slave FPGAs by the master FPGA;
identify a masking range by identifying the different address bits corresponding to the plurality of slave FPGAs;
for the different address bits, mask bit values at a specific position with same value within the masking range; and
transmit masked address bits corresponding respectively to the plurality of slave FPGAs.

2. The base station of claim 1, wherein in the different address bits, the remaining bit values other than the bit values at the specific position are identical to each other.

3. The base station of claim 1, wherein in the masked address bits, all bit values are identical to each other.

4. The base station of claim 1, wherein in the masked address bits, all bit values and address bits assigned by the master FPGA to one slave FPGAs among the plurality of slave FPGAs are identical to each other.

5. The base station of claim 4, further comprising:
a memory,
wherein the memory is configured to store a configuration bit for address bits of the master FPGA and a configuration bit for address bits assigned to the one slave FPGA.

6. The base station of claim 5, wherein the configuration bit for the address bits assigned to the one slave FPGA corresponds to all of the plurality of slave FPGAs.

7. The base station of claim 1, wherein the address masker is further configured to perform masking such that the same address bits are assigned to a plurality of slave FPGAs performing the same function, and different address bits are assigned to a plurality of slave FPGAs performing different functions.

8. The base station of claim 7, further comprising:
a memory,
wherein the memory is configured to store a configuration bit for address bits of the master FPGA, and a configuration bit which is different for each function with respect to the plurality of slave FPGAs.

9. The base station of claim 1, wherein the address masker is further configured to transmit to the master FPGA an acknowledgement response received from the plurality of slave FPGAs with respect to address bits of a read or write operation assigned to the plurality of slave FPGAs from the master FPGA.

10. The base station of claim 1, wherein the address masker is further configured to:

generate an acknowledgement response in case that the acknowledgement response is not received for a specific time duration from the plurality of slave FPGAs with respect to address bits of a read or write operation assigned to the plurality of slave FPGAs from the master FPGA; and transmit the generated acknowledgement response to the master FPGA.

11. A method performed by a base station in a wireless communication system, the base station comprising a master FPGA, a plurality of slave FPGAs controlled by the master FPGA, and an address masker coupled to the master FPGA and the plurality of slave FPGAs, and the method comprising:

receiving, by the address masker, different address bits assigned respectively to the plurality of slave FPGAs by the master FPGA;

identifying a masking range by identifying the different address bits corresponding to the plurality of slave FPGAs;

for the different address bits, masking, by the address masker, bit values at a specific position with a same value within the masking range; and transmitting, by the address masker, masked address bits corresponding respectively to the plurality of slave FPGAs.

12. The method of claim 11, wherein in the different address bits, the remaining bit values other than the bit values at the specific position are identical to each other.

13. The method of claim 11, wherein in the masked address bits, all bit values are identical to each other.

14. The method of claim 11, wherein in the masked address bits, all bit values and address bits assigned by the master FPGA to one slave FPGAs among the plurality of slave FPGAs are identical to each other.

15. The method of claim 14, wherein the base station further comprises a memory, and the method further comprises storing in the memory a configuration bit for address bits of the master FPGA and a configuration bit for address bits assigned to the one slave FPGA.

* * * * *